Figure 1:
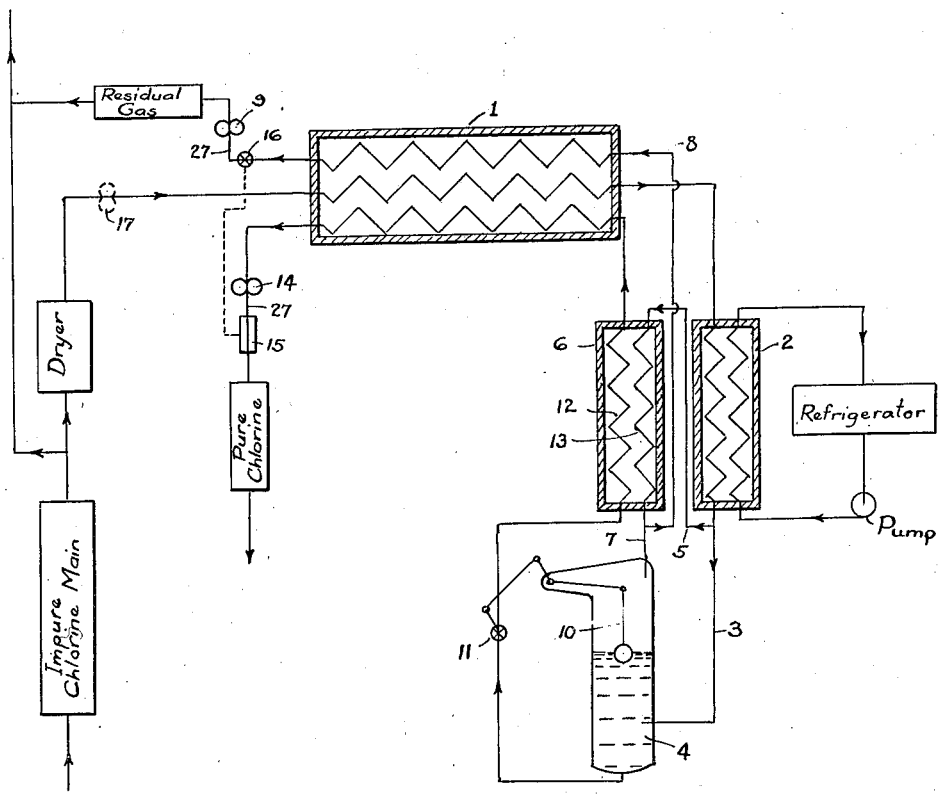

Sept. 13, 1932. E. O. BARSTOW ET AL 1,876,551
GAS PURIFICATION
Filed Sept. 11, 1929 3 Sheets-Sheet 1

INVENTORS
Edwin O. Barstow
BY Grayton F. Dressel
Thomas Griswold, Jr.
ATTORNEY

Patented Sept. 13, 1932

1,876,551

UNITED STATES PATENT OFFICE

EDWIN O. BARSTOW AND GRAYTON F. DRESSEL, OF MIDLAND, MICHIGAN, ASSIGNORS TO THE DOW CHEMICAL COMPANY, OF MIDLAND, MICHIGAN, A CORPORATION OF MICHIGAN

GAS PURIFICATION

Application filed September 11, 1929. Serial No. 391,732.

This invention relates to methods for preparing chlorine gas of high purity from relatively impure mixtures thereof with other gases less easily condensable than chlorine. In particular, it is concerned with the preparation of a relatively pure concentrated chlorine gas from the ordinary commercial gas as obtained from the usual type of electrolytic cell now largely employed in industrial plants, such procedure differing from common practice in that the separation is accomplished at moderate temperatures and pressures with the production of a gaseous final product.

The chlorine gas produced by the electrolysis of a sodium chloride solution in a cell, for instance of the diaphragm type, may normally contain as high as twenty per cent or more of gaseous impurities, chiefly air, hydrogen and carbon dioxide. A representative commercial product may be said to consist of about 85 per cent chlorine, although considerable variation from the figure given may be found under different operating conditions and with cells of different design. Assuming for the purpose of illustration, however, that a purity of 85 per cent constitutes a fair average for the gas as delivered from the electrolytic cell, the cost of separating a substantially pure chlorine gas from the accompanying diluting gases has an important bearing upon the commercial success of numerous chemical processes involving chlorination, wherein a satisfactory yield of the desired chlorinated product requires or is (advantaged) by the use of a stronger chlorine gas than that just mentioned. Examples of processes of the aforesaid character are the chlorination of methane or of aromatic hydrocarbons, such as benzene or toluene, or similar organic chemical processes involving the substitution of chlorine. On the other hand, in certain processes involving the absorption of chlorine by a more easily reactive material, such as the chlorination of ethylene or other unsaturated hydrocarbons by simple addition or in the preparation of hypochlorite solution or of chlorates, a relatively weak chlorine gas may be employed effectively, and in some cases may be preferred.

We have devised a method for the treatment of impure chlorine gas such as is produced by commercial methods, whereby a large fraction of the chlorine in such gas may be separated as nearly pure chlorine gas. Working with a commercial chlorine gas of 80 to 90 per cent strength or thereabout, we may convert from 50 to 75 per cent (volumetric) of the chlorine content thereof to a product closely approaching 100 per cent purity while the balance of the chlorine is delivered as a weaker gas containing as high as 60 per cent or more (volumetric) chlorine gas entirely suitable for use in reactions of the second type mentioned above, and we do this with a materially lower consumption of energy than that required in other methods hitherto practised. In consequence thereof chlorine gas of high purity may be produced by means of our improved method at a lower cost than has been possible heretofore.

Accordingly, among the principal objects of our present invention is the production of chlorine gas of high purity from an impure gas such as relatively strong commercial cell chlorine gas or the like. Another object is to provide a method whereby such chlorine gas of high purity may be economically produced. Further objects and advantages will appear as the description proceeds.

To the accomplishment of the foregoing and related ends, the invention, then, consists of the steps hereinafter fully described and particularly pointed out in the claims, the annexed drawings and following description setting forth in detail several modes of carrying out the invention, such disclosed modes illustrating, however, but several of various ways in which the principle of the invention may be used.

In said annexed drawings:—

Figure 2:
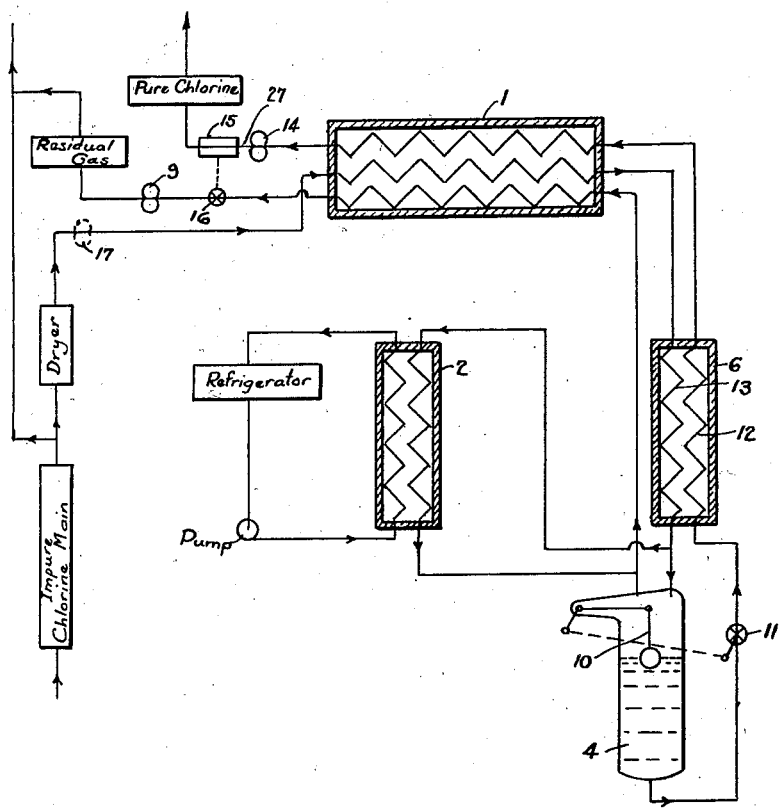
Figure 3:
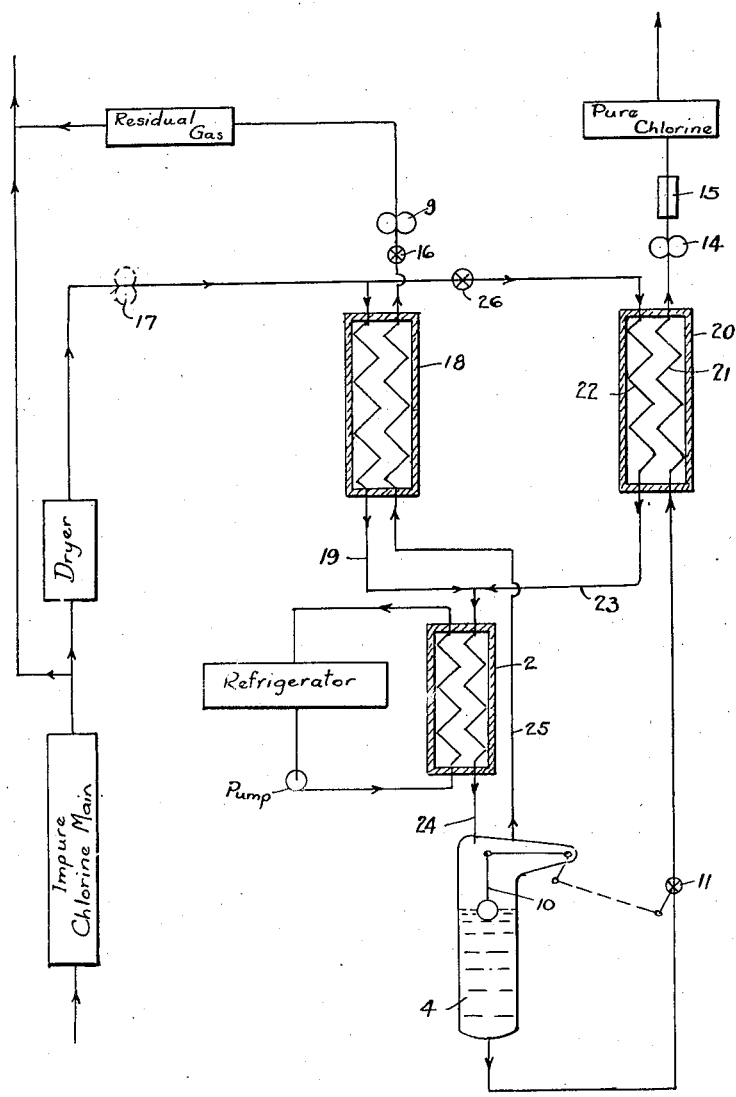

Fig. 1 shows in diagrammatic manner a preferred combination of apparatus for carrying out our process. Fig. 2 shows a modification of Fig. 1 wherein the external refrigeration step is subsequent to cooling the incoming impure chlorine gas with vaporizing liquid chlorine. Fig. 3 shows in diagrammatic manner a method of dividing the incoming impure chlorine gas and passing the so divided gas, prior to applying external refrigeration, in heat exchange relation with the outgoing products of the process.

In general our process consists in drying, if excessive moisture is present, the impure chlorine gas such as produced by electrolysis of a sodium chloride solution, and then passing a stream of all or a part of said dried impure chlorine gas through heat interchangers in countercurrent to streams of the pure chlorine fraction and residual gas, the system being well insulated and automatic in its operation and requiring only enough external refrigeration to be supplied to compensate for heat absorption and other heat losses.

Referring more particularly to the drawings, Fig. 1 shows the impure chlorine passing through a drier and thence being passed to a sensible heat exchanger 1, wherein the impure gas passes in countercurrent heat exchange relation to cold pure chlorine gas and residual gas in separate conduits. The impure gas is thus precooled and the outgoing gases warmed up to near the initial temperature of the impure gas. The thus precooled impure gas then passes through a refrigeration step 2 wherein sufficient cooling is accomplished to compensate for heat leakage, difference in temperature between the inlet and outlet gases, etc. During this refrigeration step a portion of the chlorine in the gas will be condensed and will pass down pipe 3 into liquid chlorine container 4. The residual uncondensed gas then passes through pipe 5 into heat exchange relation with vaporizing chlorine in latent heat exchanger 6. In this step a further portion of chlorine is liquefied and passes through pipe 7 into liquid chlorine container 4. The residual uncondensed gas passes through pipe 8 to sensible heat exchanger 1, previously described, where it passes in countercurrent to the incoming impure chlorine. The residual gas leaving sensible heat exchanger 1 passes to pump 9 which returns such residual gas to the chlorine main or otherwise as may be desired. The liquid container 4 has mounted therein a device such as float mechanism 10 which is operated by the height of the liquid chlorine in container 4 and controls the opening or closing of expansion valve 11 or the like, to release the liquid, with reduction of pressure thereon induced by operation of pump 14, into tube or conduit 12 of latent heat exchanger 6 wherein it vaporizes and absorbs heat from the mixed gases passing through conduit 13 so as to liquefy a portion of the gases, as already shown above. The vaporized chlorine in tube 12 is then withdrawn by pump 14, passes through sensible heat exchanger 1 in direction countercurrent to the incoming mixed gases and is delivered to the pure chlorine main 27 or otherwise at a predetermined desired pressure. Regulator 15 on the pure chlorine main is connected with valve 16 on the residual gas delivery and is arranged so that if the gas pressure in the pure chlorine main varies above or below a set pressure, throttling valve 16, or equivalent means, will decrease or increase the amount of gas passed to pump 9 and thereby control the amount of gas drawn through the system. Gas pumps 9 and 14 operate to produce a suction on the system and thus draw the dry impure chlorine gas thereinto. However, if the pressure on the dry impure inlet chlorine main should fall below 5 pounds per square inch gauge or if such pressure should be normally approximately atmospheric, the use of a pressure pump 17 (shown dotted) may be found desirable and under such conditions pumps 9 and 14 may in some cases be omitted. However, it is to be noted that the pressure on the system is preferably kept at a relatively low point while maintaining for instance a drop of 10 pounds pressure through expansion valve 11. The reason for this is that for the same pressure drop at low working pressures, the temperature drop in the chlorine being vaporized in heat exchange relation, for instance in container 6, is greater than would be the case with a higher inlet pressure and the same pressure drop through the expansion valve. It is thus to be seen that with lower working pressures and the same pressure drop such greater temperature drop will enable smaller heat exchangers to be used, and a more efficient operation may also be obtained due to the decreased heat leakage which must be compensated for with relatively expensive external refrigeration.

Fig. 2 is a modification of the system shown in Fig. 1 wherein the external refrigeration step 2 is placed after the expanding chlorine refrigeration step 6 instead of ahead of it. This system is as workable as the system shown in Fig. 1 but is not quite as economical due to placing the external refrigeration step 2 last, wherein it will have to operate at a lower temperature than is the case with the system shown in Fig. 1. The control features described in conjunction with Fig. 1 operate in similar manner here.

Fig. 3 shows the dry impure chlorine entering the system in divided flow manner, part of the gas passing through sensible heat exchanger 18 in countercurrent to the cold residual gas leaving the system, the so precooled dry impure chlorine gas passing thence through pipe 19 to refrigeration step 2 where it joins the second portion of dry impure chlorine gas which was by-passed to heat exchanger 20 wherein it gave up heat to lower pressure vaporizing pure chlorine and chlorine gas, part of the dry impure chlorine condensing in conduit 22 and both liquid and gas passing through pipe 23 to join the flow through pipe 19 going to refrigeration step 2 where a further portion of the chlorine is liquefied. The liquefied chlorine and residual gas pass through pipe 24 into liquid chlorine container 4 from whence the residual gases pass through pipe 25 to sensible heat exchanger 18 as previously described. The liquid chlorine in container 4 passes to expansion valve 11 or the like where its pressure is dropped, allowing it to vaporize at lower pressure and temperature and to then absorb heat in heat exchanger 20. The pump and control system, as described in conjunction with Fig. 1, applies here in similar manner. Valve 26, which may be automatically controlled, governs the proportionate division of the dry impure chlorine flowing in parallel through heat exchangers 18 and 20.

As an aid to better understanding the principles of our invention, a specific example of the operation of the system illustrated in Fig. 1 will now be given.

Dry impure chlorine gas containing 85 per cent chlorine by volume at 10 pounds gauge pressure and at a temperature of 20° C. is admitted to sensible heat exchanger 1 where it gives up heat to the outgoing cold vent gas and pure chlorine gas. The temperature of the dry impure chlorine is thereby lowered in this exchanger to −25° C., at which temperature liquefaction begins, following which its passes to the external refrigeration step 2 wherein it is subjected to a temperature of approximately −30° C., which further lowers the temperature of the impure gas to approximately −25½° C. Such cooling is accompanied by liquefaction of approximately 7.0 per cent of the chlorine contained in the original dry impure gas. Such liquid chlorine passes through pipe 3 to liquid chlorine container 4. The remaining impure chlorine gas then passes to latent heat exchanger 6 where condensation of 53 per cent of the chlorine originally contained in the dry impure gas takes place, the residual gas being thereby cooled to −30° C. Such residual gas then passes to sensible heat exchanger 1 where its temperature is raised to a point approaching 20° C. by absorbing heat from the incoming dry impure chlorine gas. The residual gas leaving the system at this point contains approximately 70 per cent of chlorine by volume. The liquid chlorine in container 4 passes through expansion valve 11 wherein its pressure is dropped, for instance, 10 pounds, it then passing through container 12 in latent heat exchanger 6 where it starts to vaporize at a temperature of −34° C. In vaporizing and passing through the latent heat exchanger its temperature rises to −33° C. during which time it has absorbed heat from the condensing impure chlorine. It then passes to sensible heat exchanger 1 from which it leaves the system at a temperature approaching 20° C. and is delivered to the pure chlorine main. Upwards of 60 per cent of the chlorine in the original gas is thus liquefied, vaporized and heated as a product of the method.

It is to be noted that our improved system, aside from the external supply of sufficient cooling to overcome heat leakage and the like is entirely self-contained and automatically operated. For instance, if the pressure of the dry impure chlorine passing into the system should drop, the immediate effect would be to decrease the flow of gas to the system which would result in less chlorine condensing in heat exchangers 2 and 6 (Fig. 1) with the result that the liquid chlorine level in container 4 would tend to drop, such dropping would cause automatic device 10 to operate throttle valve 11 or the like, decreasing the amount of liquid chlorine passed to expansion step 6. This in turn would increase the pressure differential on opposite sides of expansion valve 11 with the result that a lower temperature would immediately become apparent in pipe or container 12 which in itself would tend to increase the proportionate amount of chlorine liquefied. However, at the same time due to expansion valve 11 or the like closing slightly a smaller quantity of liquid chlorine would be passed to heat exchangers 6 and 1 which will normally result in a lower pressure prevailing in the pure chlorine main at 15. Automatic controller 15 would then operate to open valve 16 or the like allowing pump 9 to draw more gas through the system which would automatically furnish the necessary chlorine for condensation with the result that the liquid chlorine level in 4 would rise and valve 11 open slightly thus placing the system back in equilibrium. In similar manner the controls function to compensate for a rise in inlet pressure, variation in chlorine content of the inlet gas or combinations of such variables. It is to be noted, of course, in this connection that if the chlorine content of the inlet gas is low the system becomes less economical to operate than with a higher percentage of chlorine.

We are aware that the production of liquid chlorine from gaseous impure chlorine is practised. In such processes the practice is to liquefy as near all of the chlorine in the gas mixture as possible, leaving a residual gas weak in chlorine not well suited to general use, and in fact suited to a very narrow use. The production of liquid chlorine in this manner requires either high pressure and moderately low temperatures or moderately low pressures and extremely low temperatures such as obtained with ethane as refrigerant. Our invention, however, is not concerned with the production of liquid chlorine as a product, nor is it concerned with the use of high pressures or extremely low temperatures as means for obtaining the final products. It is concerned with the separation of at least a portion of the chlorine in the gas mixture as a relatively pure gas suited to preferred uses while leaving the balance in condition for a less preferential range of uses although a wide one.

Other modes of applying the principle of our invention may be employed instead of those explained, change being made as regards the means and the steps herein disclosed, provided those stated by any of the following claims or their equivalent be employed.

We therefore particularly point out and distinctly claim as our invention:—

1. The method of preparing substantially pure chlorine gas from an approximately 80 to 90 per cent mixture thereof with air and other permanent gases which comprises introducing such mixture at a pressure not greatly in excess of atmospheric pressure, cooling to a temperature of approximately $-25°$ C. by exchange of heat with residual products of the process, further cooling to a temperature between about $-30°$ C. and $-34°$ C. by exchange of latent heat with previously liquefied chlorine revaporizing at a lower pressure, whereby a portion of the chlorine content of the mixed gases is liquefied, separating the liquid from the uncondensed gases, reducing the pressure on such liquid, revaporizing the same in indirect heat transfer relation with the cooled gases in said liquefying step, conducting such revaporized chlorine and uncondensed gases separately to the initial cooling step and passing the same in countercurrent heat exchange relation with the incoming gases.

2. The method of preparing substantially pure chlorine gas from an approximately 80 to 90 per cent mixture thereof with air and other permanent gases which comprises introducing such mixture at a pressure not greatly in excess of atmospheric pressure, cooling to a temperature of approximately $-25°$ C. by exchange of heat with residual products of the process, further cooling to a temperature between about $-30°$ C. and $-34°$ C. by exchange of latent heat with previously liquefied chlorine revaporizing at a lower pressure, whereby a portion of the chlorine content of the mixed gases is liquefied, separating the liquid from the uncondensed gases, reducing the pressure on such liquid, revaporizing the same in indirect heat transfer relation with the cooled gases in said liquefying step, conducting such revaporized chlorine and uncondensed gases separately to the initial cooling step passing the same in counter-current heat exchange relation with the incoming gases and controlling the volume of mixed gases introduced in accordance with the pressure of said revaporized chlorine.

Signed by us this 7th day of September, 1929.

EDWIN O. BARSTOW.
GRAYTON F. DRESSEL.